United States Patent
Ishida (10) Patent No.: US 8,757,940 B2
(45) Date of Patent: Jun. 24, 2014

(54) CUTTING INSERT, CUTTING TOOL AND CUTTING METHOD FOR WORKPIECE USING THE SAME

(75) Inventor: Takuya Ishida, Fukuoka (JP)

(73) Assignee: Kyocera Corporation, Kyoto (JP)

( * ) Notice: Subject to any disclaimer, the term of this patent is extended or adjusted under 35 U.S.C. 154(b) by 657 days.

(21) Appl. No.: 13/126,912

(22) PCT Filed: Jan. 27, 2010

(86) PCT No.: PCT/JP2010/051057
§ 371 (c)(1),
(2), (4) Date: Apr. 29, 2011

(87) PCT Pub. No.: WO2010/087376
PCT Pub. Date: Aug. 5, 2010

(65) Prior Publication Data
US 2011/0211926 A1    Sep. 1, 2011

(30) Foreign Application Priority Data
Jan. 29, 2009   (JP) .................................. 2009-017921

(51) Int. Cl.
*B23C 5/20* (2006.01)

(52) U.S. Cl.
USPC ........... 409/132; 407/113; 407/114; 407/115; 407/42; 407/61

(58) Field of Classification Search
CPC .... B23C 5/20; B23C 5/205; B23C 2200/085; B23C 2200/086; B23C 2200/087; B23C 2200/125; B23C 2200/32; B23C 2200/323; B23C 2200/326
USPC ........ 409/131, 132; 407/113–116, 42, 53, 61, 407/58–60
See application file for complete search history.

(56) References Cited

U.S. PATENT DOCUMENTS

| | | | |
|---|---|---|---|
| 5,221,164 A * | 6/1993 | Allaire | 407/113 |
| 7,182,555 B2 * | 2/2007 | Kitagawa et al. | 407/113 |
| 7,802,946 B2 * | 9/2010 | Ishida | 407/113 |
| 2008/0219784 A1 | 9/2008 | Yamazaki et al. | |
| 2009/0188356 A1 | 7/2009 | Ishida | |
| 2010/0047026 A1 * | 2/2010 | Horiike et al. | 407/40 |
| 2010/0316452 A1 | 12/2010 | Ishida | |
| 2011/0170963 A1 * | 7/2011 | Smilovici et al. | 407/42 |

FOREIGN PATENT DOCUMENTS

| | | |
|---|---|---|
| JP | 8-118135 | 5/1996 |
| JP | 8294805 A | 11/1996 |
| JP | 9-057519 | 3/1997 |
| JP | 10-138033 | 5/1998 |
| JP | 2003-025135 | 1/2003 |

(Continued)

*Primary Examiner* — Daniel Howell
*Assistant Examiner* — Nicole N Ramos
(74) *Attorney, Agent, or Firm* — Volpe and Koenig, P.C.

(57) ABSTRACT

A cutting insert has a main body which is provided with an upper surface, a side surface, at least one groove which is formed in the side surface and which extends to the upper surface at one end, and a plurality of split cutting blades which are split by the at least one groove. The upper surface is provided with inclined portions corresponding to the split cutting blades. The distance of respective lower ends of the inclined portions from the corresponding split cutting blades increases toward the centers of the corresponding cutting blades in a plan view. A cutting tool having the cutting insert and a method for cutting a workpiece using the cutting tool are also provided.

10 Claims, 6 Drawing Sheets

(56) References Cited

FOREIGN PATENT DOCUMENTS

| JP | 2005342871 A | 12/2005 |
|----|--------------|---------|
| JP | 2007-083381 | 4/2007 |
| JP | 2008-068345 | 3/2008 |
| JP | 2008213122 A | 9/2008 |
| WO | WO2006035910 A | 4/2006 |
| WO | WO2007049617 A | 5/2007 |
| WO | WO2008123375 A | 10/2008 |

* cited by examiner

CUTTING INSERT, CUTTING TOOL AND CUTTING METHOD FOR WORKPIECE USING THE SAME

TECHNICAL FIELD

The present invention relates to a cutting insert, a cutting tool to which the cutting insert is attached and a cutting method for workpiece using the cutting tool.

BACKGROUND ART

Conventionally, through-away type cutting tools having excellent economical efficiency have been heavily used as cutting tools (for example, rotating tools) such as face mills and end mills. The cutting tool is formed by attaching a cutting insert to a holder.

The cutting insert having a long cutting edge is subjected to a large load at cutting. In order to reduce this load, for example, Unexamined Patent Publication No. 9-57519 discloses a cutting insert including a cutting edge located at an intersection between an upper surface and a side surface, and a groove formed on the side surface so as to divide the cutting edge. When the cutting insert is used for the cutting tool, a chip finely divided in the width direction is generated, so that cutting resistance applied to the cutting insert at cutting can be reduced. As the number of the grooves is increased, the length of each of the divided cutting edges becomes smaller and thus, the width of the chip also becomes smaller, thereby reducing the cutting resistance.

Since the narrow chips are easy to curl and discharged in an extended state, the chip tends to be clogged between the workpiece and the cutting edge. This configuration may disadvantageously cause damage of a worked surface of the workpiece and the cutting insert. Therefore, there has been a demand for a cutting insert that reduces the cutting resistance at cutting and has excellent chip discharging efficiency.

SUMMARY OF THE INVENTION

An object of the present invention is to provide a cutting insert that reduces the cutting resistance at cutting and has excellent chip discharging efficiency. Another object of the present invention is to provide a highly durable cutting tool to which the cutting insert is attached and a cutting method for a workpiece using the cutting tool.

A cutting insert in accordance with an embodiment of the present invention includes a main body having an upper surface, a side surface, a groove that is formed on the side surface and extends to the upper surface at one end and a plurality of divided cutting edges that are located at an intersection line of the upper surface and the side surface and divided by the groove. The upper surface includes inclined parts located corresponding to the divided cutting edges, the inclined parts being in higher positions as being away from the intersection line. A distance of lower ends of the inclined parts from the corresponding divided cutting edges increases toward centers of the corresponding divided cutting edges from ends thereof in a top plan view.

A cutting tool in accordance with an embodiment of the present invention includes a holder and the cutting insert attached to an outer part of the holder at a front end, and at least a part of the plurality of divided cutting edges protrudes outwards from the outer part of the holder at the front end.

A cutting method for workpiece in accordance with an embodiment of the present invention is a method of cutting the workpiece by use of the cutting tool includes steps of rotating the cutting tool, bringing at least a part of the plurality of divided cutting edges of the rotating cutting tool into contact with a surface of the workpiece and separating the workpiece from the cutting tool.

According to the cutting insert, the cutting resistance at cutting can be reduced and even with a narrow chip having no sufficient rigidity to curl can be given appropriate rigidity by compression in the width direction and thus, can be curled. Therefore, according to the cutting insert, the cutting resistance at cutting can be reduced and excellent chip discharging efficiency can be achieved even with chips of small width. The cutting tool can have excellent durability. According to the cutting method for workpiece, cutting with high working accuracy can be stably performed over a long time.

BRIEF DESCRIPTION OF DRAWINGS

FIG. 4 shows (a) A sectional view taken along a line A-A, 4(b) shows a sectional view taken along a line B-B, 4(c) shows a sectional view taken along a line C-C and 4(d) shows a sectional view taken along a line D-D of FIG. 3.

DETAILED DESCRIPTION

<Cutting Insert>

Figure 1:
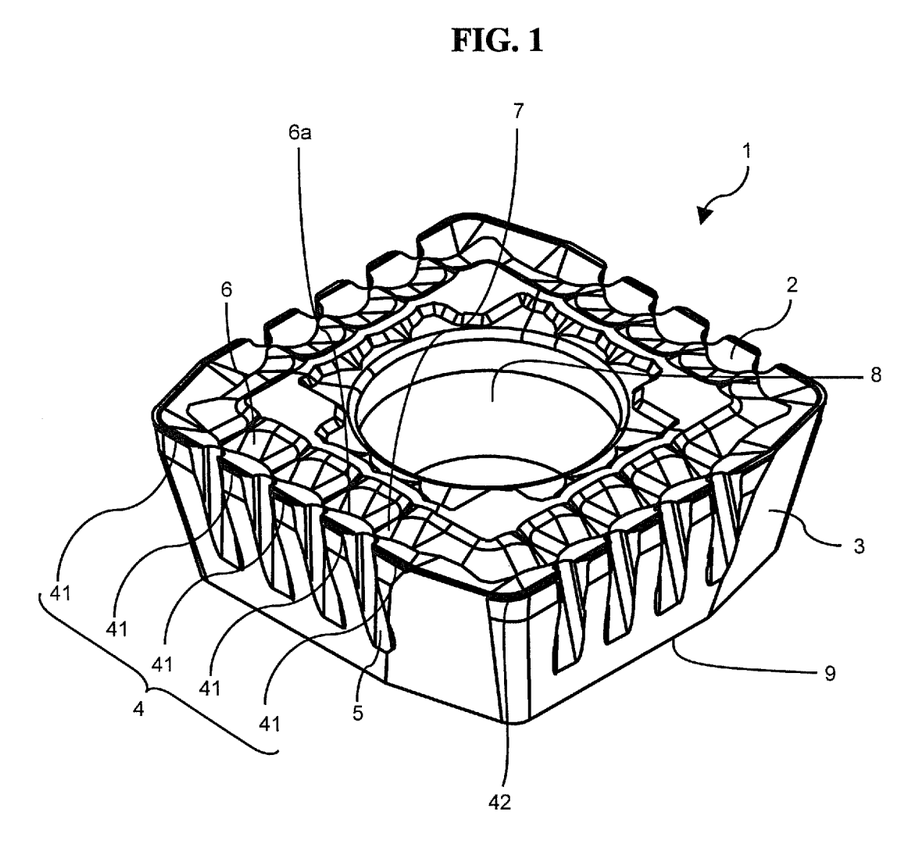
FIG. 1 shows a whole perspective view showing a cutting insert in accordance with an embodiment of the present invention.
Figure 2A:
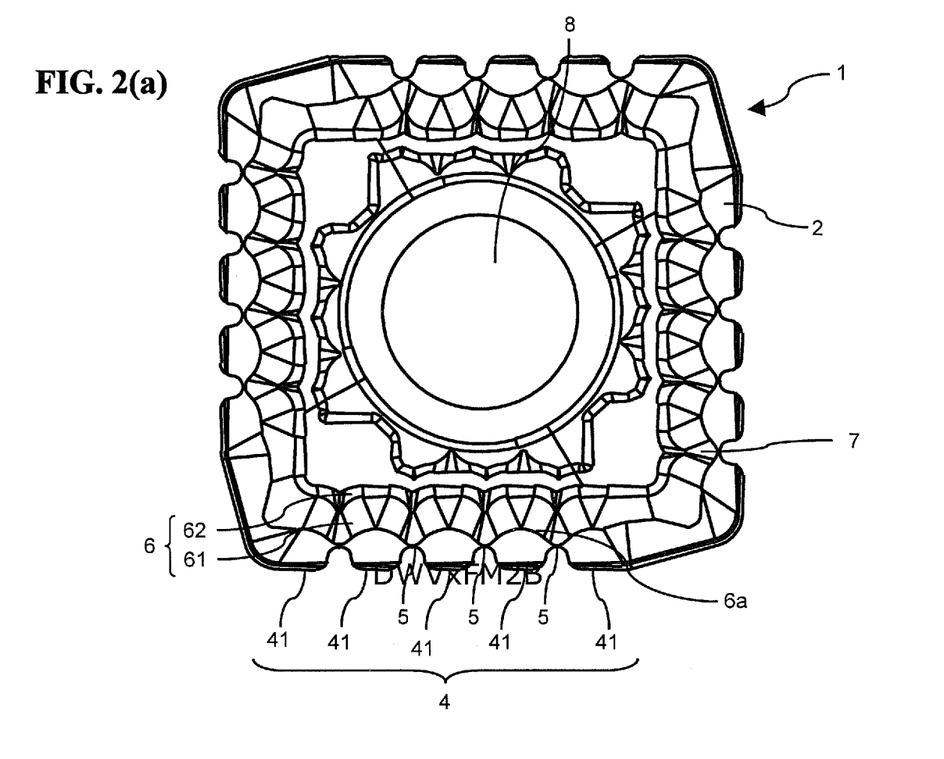
FIGS. 2(a) shows a plan view and 2(b) shows a side view of the insert in FIG. 1.
Figure 2B:
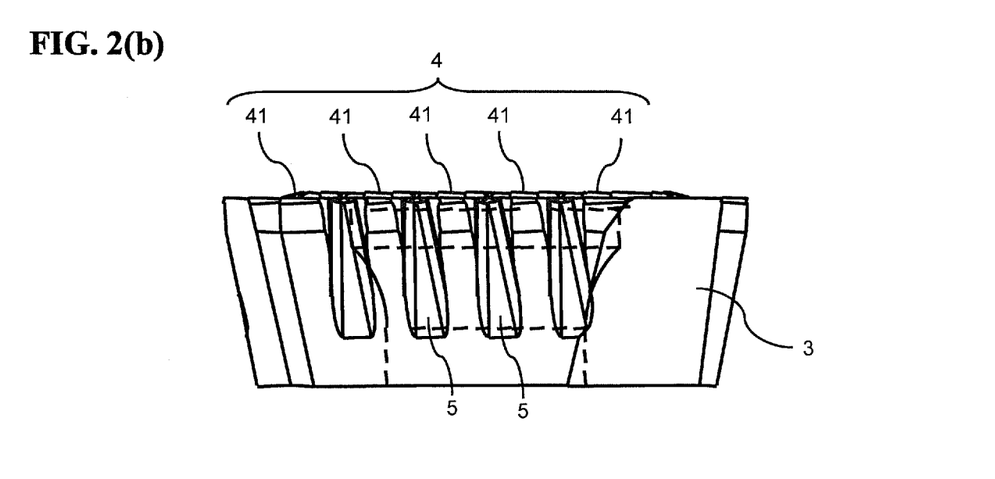

An embodiment of a cutting insert according to the present invention will be described in detail with reference to FIGS. 1 to 4. As shown in FIG. 1 and FIG. 2, the cutting insert in accordance with this embodiment (hereinafter refereed to as "insert") 1 is formed of a main body having an upper surface 2, side surfaces 3 and a lower surface 9. A through hole 8 that penetrates the upper surface 2 and the lower surface 9 is substantially vertically formed at the center of the upper surface 2. The through hole 8 serves to insert a screw member 21 for fixing the insert 1 to a holder 11 described later thereinto.

A cutting edge 4 is formed along an intersection line between the upper surface 2 and each side surface 3. A plurality of grooves 5 that extend to the upper surface 2 and divide the cutting edge 4 are formed on each of the side surfaces 3. The cutting edge 4 includes a plurality of divided cutting edges 41 divided by the grooves 5. Further, inclined parts 6 corresponding to the divided cutting edge 41 are formed on the upper surface 2 so as to be located in higher positions as they move inwards from the cutting edge 4, that is, away from the intersection line. The "inwards" means the inner side of the insert 1 relative to the cutting edge 4, that is, the side of the through hole 8.

The main body of the insert 1 is shaped like a substantially polygonal plate. Specifically, the main body is shaped like a substantially rectangular plate in a top plan view. Thus, the insert 1 has four cutting edges 4. The shape of the polygon is not specifically limited and may be the shape that those skilled in the art normally employ for the insert, such as triangle, tetragon, pentagon, hexagon and octagon.

A region of the upper surface 2, which conforms to the cutting edges 4, functions as a cutting face. A region of the side surfaces 3, which conforms to the cutting edges 4, functions as a relief. The lower surface 9 functions as a seating face attached to the holder 11. In this embodiment, the side surfaces 3 inclines so as to be located inwards toward the lower surface 9. That is, the insert 1 is a positive insert in which a positive relief angle α is given to the side surface 3 functioning as the relief. The relief angle α is appropriately selected from the range of 5 to 30 degrees.

Each of the cutting edges 4 includes the plurality of divided cutting edges 41 divided by the plurality of grooves 5 placed on the side surface 3 side by side. In this embodiment, the cutting edge 4 includes five divided cutting edges 41. A corner cutting edge 42 connected to the cutting edge 4 is formed on the intersection line between the upper surface 2 and the side surface 3 at each corner of the insert 1.

As described above, the grooves 5 are formed so as to divide the cutting edges 4. Thus, since chips generated by the divided cutting edges 4 become small, the cutting resistance at cutting can be reduced. Such insert 1 having the plurality of divided cutting edges 41 is especially suitable for heavy cutting.

The shape of the grooves 5 is not specifically limited as long as they are formed so as to extend to the upper surface 2. For example, in a top plan view, the grooves may be linear or as shown in FIG. 2(b), a part of the grooves 5 may be made wide. The width and depth of the grooves 5 are not also specifically limited. For example, in consideration of the load applied at cutting, the width of an intermediate part of each groove may be made largest.

The number of the grooves 5 may be set depending on the type of the used workpiece. Generally speaking, as the number of grooves 5 is larger, the cutting resistance is decreased, but the width of the resulting chip becomes smaller. For this reason, in the conventional insert, when the number of the grooves is increased, enough rigidity to curl the chip cannot be obtained, lowering the chip discharging efficiency. Therefore, when considering the chip discharging efficiency, the number of the grooves on one side surface is practically limited.

In this embodiment, as described later, the insert is provided with the inclined parts 6 each having a rising part (that is, a lower end of the inclined part 6) 6a, a distance from the corresponding divided cutting edge 41 of which increases toward the center of the divided cutting edge 41 from the end of the divided cutting edge 41. The lower ends 6a are curved in a top plan view. For this reason, by compression in the width direction, even a narrow chip can have appropriate rigidity to be curled. Therefore, even when more grooves 5 are provided than a conventional insert, the excellent chip discharging efficiency can be achieved.

In this embodiment, four grooves 5 are formed on one side surface 3. Two to five grooves 5 are generally formed on one side surface 3. Although the same number of grooves 5 is formed on each side surface 3, different side surfaces 3 may have different number of grooves.

For example, the grooves 5 are preferably disposed on each side surface 3 so as to be rotationally symmetric about a center line vertically extending in the thickness direction of the main body.

Figure 4A:
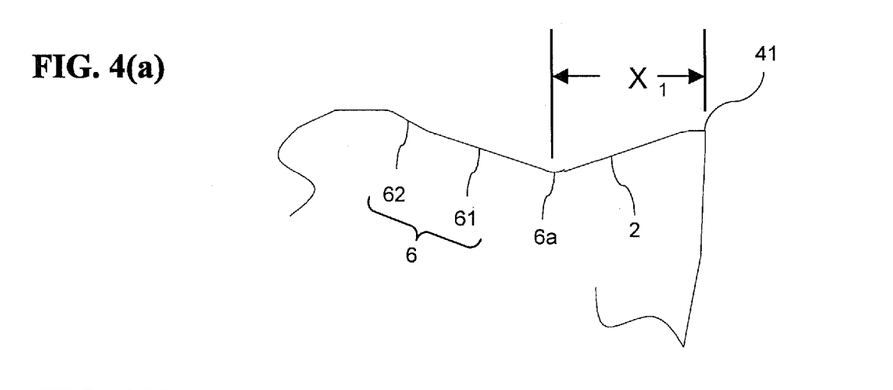
Figure 4B:
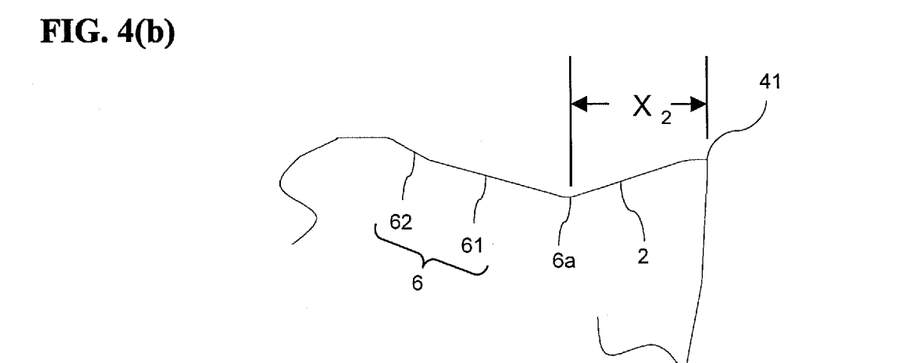

The inclined parts 6 are formed inward of the cutting face along the divided cutting edges 41 on the upper surface 2. As shown in FIGS. 4(a), 4(b), each inclined part 6 is formed so as to have a larger height from the lower surface 9 (seating face) as inclined part 6 moves away from the divided cutting edge 41.

The inclined parts 6 are formed to curl the chips generated by the divided cutting edges 41. Therefore, as shown in FIG. 1 and FIG. 2, the plurality of inclined parts 6 corresponding to the respective divided cutting edges 41 are formed along the divided cutting edges 41.

Figure 3:
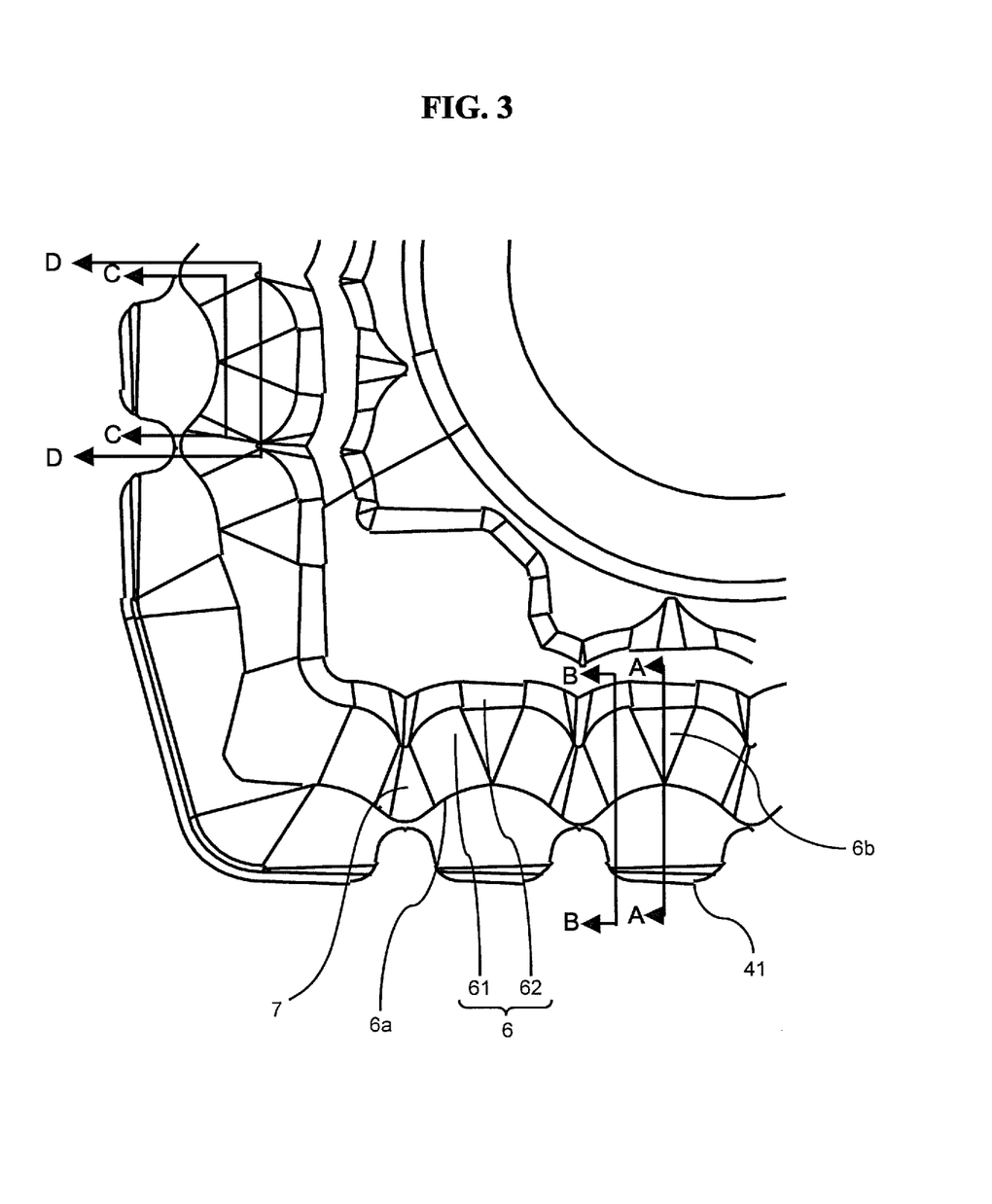
FIG. 3 shows an enlarged view of a main part of FIG. 2(a).

As shown in FIG. 3, in a top plan view, each inclined parts 6 is formed so that the lower end 6a is away from the corresponding divided cutting edge 41 toward the center of the divided cutting edge 41 from both ends of the divided cutting edge 41. That is, the distance from the corresponding divided cutting edge 41 increases toward the center of the divided cutting edge 41 from the both ends of the divided cutting edge 41. For example, given that the distance between the lower end 6a and the divided cutting edge 41 in FIG. 4(a) is $X_1$ and the distance between the lower end 6a and the divided cutting edge 41 in FIG. 4(b) is $X_2$, $X_1$ is larger than $X_2$. As shown in FIG. 3, the lower end 6a is formed to be concave in a top plan view. With such configuration, the chips generated by the divided cutting edges 41 firstly come into contact with the lower ends 6a of the inclined parts 6 from ends thereof in the width direction, thereby being squeezed (compressed in the width direction), resulting in that enough rigidity to curl the chips to be narrower is imparted to the chips.

Figure 4C:
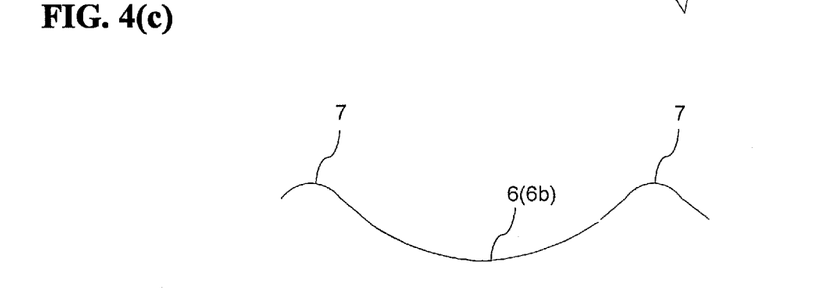
Figure 4D:
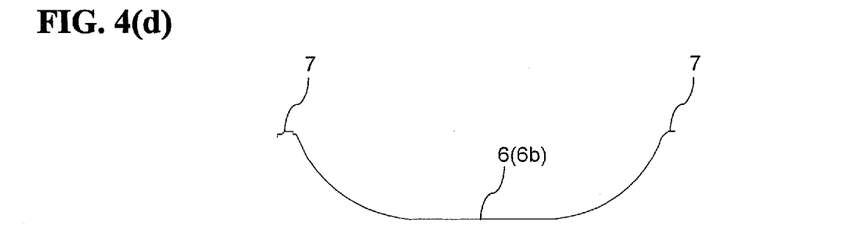

For example, as shown in FIGS. 4(c) and 4(d), each inclined part 6 preferably has a recessed first concave part in a cross section taken along a line parallel to the divided cutting edge 41 in a top plan view, for example, a vertical cross section parallel to the divided cutting edge 41 (hereinafter referred to as "parallel cross section"). That is, each inclined part 6 has a concave surface extending perpendicular to the intersection line. Thereby, the chip compressed by the lower end 6a in the width direction is curled while holding its compressed state.

As shown in FIGS. 4(c) and 4(d), the first concave part of the concave inclined part 6 may partially have a flat part 6b in the parallel cross section. Specifically, each inclined part 6 has the flat surface 6b having substantially uniform height toward ends of the corresponding divided cutting edge 41 from the center of the divided cutting edge 41. In FIGS. 4(c) and 4(d), the width of the flat part 6b is larger as the flat part 6b is away from the divided cutting edge 41. That is, as shown in FIG. 3, the flat part 6b is substantially triangular. Thereby, suitable discharge to the outside (chip discharging efficiency) can be achieved without retention of the curled chip in the inclined part.

In the above-mentioned case, the curvature of a curved surface adjacent to the flat part 6b is appropriately set according to the shape of the inclined parts 6. For example, the flat part 6b shown in FIGS. 4(c) and 4(d) is located at the center of the inclined parts 6. The cross section shown in FIG. 4(d) is further from the divided cutting edge 41 than the cross section in FIG. 4(c). The curvature of the curved surface adjacent to the flat part 6b in FIG. 4(c) is set to be smaller than the curvature of the curved surface adjacent to the flat part 6b in FIG. 4(d).

Further, as shown in FIG. 3 and FIG. 4, it is preferred that each inclined part 6 has a first inclined part 61 including the lower end 6a and a second inclined parts 62 that is in a higher position than the first inclined parts 61 and has a large inclination angle relative to a horizontal surface (lower surface 9). The term "higher position" means a higher position in the thickness direction of the insert 1. More specifically, when the insert 1 is set on the lower surface 9 as the seating face, the second inclined part 62 is located in a higher position using the cutting edge 4 as a reference.

In the case where the inclined part 6 has at least two inclined surfaces having different inclination angles relative to the horizontal surface, it is possible to curl chips of various thicknesses. For example, chips of different thicknesses are generated according to the feed rate of the cutting tool. In this embodiment, the chip of large thickness can be curled by the first inclined parts 62 having a smaller inclination angle, while the chip of small thickness can be curled by the second inclined parts 61 having a larger inclination angle. In addition, curl radius and chip discharge can be also controlled. The above-mentioned effects can be also obtained, for example, by making the inclined parts 6 to be a curved part having many continuous inclined surfaces having different inclination angles relative to the horizontal surface, that is, a recessed second concave part when viewed from a cross section perpendicular to the divided cutting edge 41.

Protruded parts 7 alternately placed with the inclined parts 6 are formed on the upper surface of the insert 1. The protruded parts 7 serve to stabilize the chip discharging direction so as to prevent the chips generated by the divided cutting edges 41 from contacting each other, and to guide the chips to the inclined parts 6. Thereby, the chips can be reliably curled. In FIG. 2, the plurality of protruded part 7 are formed so as to extend inwards from the respective grooves 5.

Each of the protruded parts 7 has a pair of inclined side surfaces. The pair of inclined side surfaces are inclined from the top of the protruded part 7 toward the cutting faces of the upper surface 2, which correspond to two divided cutting edges 41 located at the both ends of the grooves 5. The protruded parts 7 each have such pair of side surfaces, thereby preventing the discharging direction of the chips generated by the divided cutting edges 41 from swinging to the left and to the right.

<Cutting Tool>

Figure 5:
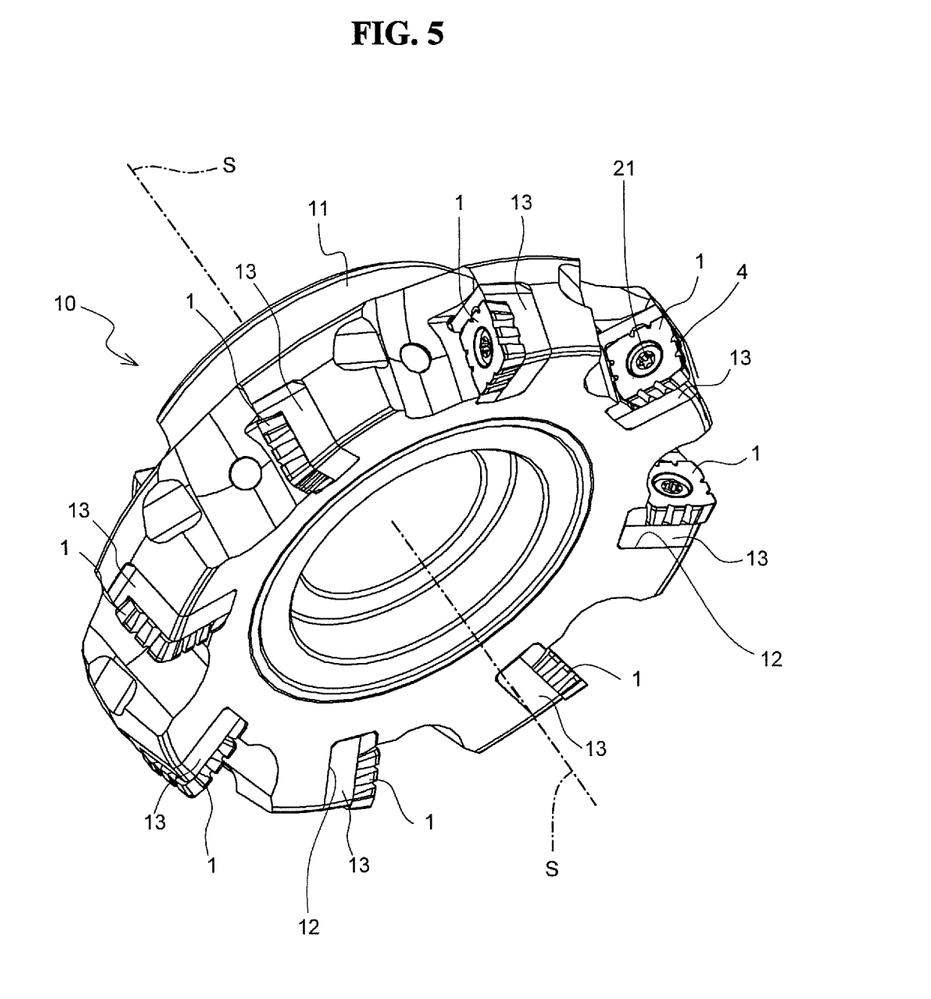
FIG. 5 shows a whole perspective view showing a cutting tool in accordance with an embodiment of the present invention.

Next, with reference to FIG. 5, an embodiment of the cutting tool according to the present invention will be described. As shown in FIG. 5, the cutting tool 10 is formed by attaching the above-mentioned insert 1 to an outer part of the holder 11 at a front end.

In this embodiment, although the holder 11 is shaped like a disc, the holder may be rod-like, cylinder-like, etc. The holder 11 has eight insert pockets 12 to which the insert 1 is attached. Thus, the cutting tool 10 includes eight inserts 1.

Each insert 1 is attached so that the divided cutting edges 41 protrude from the outer circumferential surface of the holder 11. Each insert 1 is screwed into the insert pocket 12 by the screw member 21.

The cutting tool 10 is provided with the insert 1, thereby preventing a plurality of chips finely divided in the width direction from striking against each other. As a result, it is possible to improve the chip discharging efficiency and increase the life of the tool.

In this embodiment, the insert 1 is attached to the insert pocket 12 through a sheet member 13. Thus, even when a defect occurs in the cutting edge 4 of the insert 1 or the like, since the holder 11 located at the defect of the cutting edge 4 is protected with the sheet member 13, damage of the holder 11 can be suppressed. Therefore, the life of the holder 11 can be increased.

In the insert 1 in this embodiment, each of the divided cutting edges 41 is inclined so as to get away from its front end toward its rear end with respect to an axis line S of the holder 11. That is, the insert 1 is formed by attaching the divided cutting edges 41 with a positive axial rake angle to the holder 11. Thereby, the cutting resistance can be further reduced. For this reason, even under more harsh cutting conditions such as heavy cutting with a large cutting amount, excellent cutting performances can be achieved.

In this embodiment, when attaching the insert 1 to the insert pockets 12, the sheet member 13 is placed between the insert 1 and the insert pocket 12, but the insert 1 may be in direct contact with the insert pocket 12. Further, although the cutting tool in this embodiment is a face mill, the cutting tool is not limited to the face mill and may be an end mill.

<Cutting Method for Workpiece>

Figure 6A:
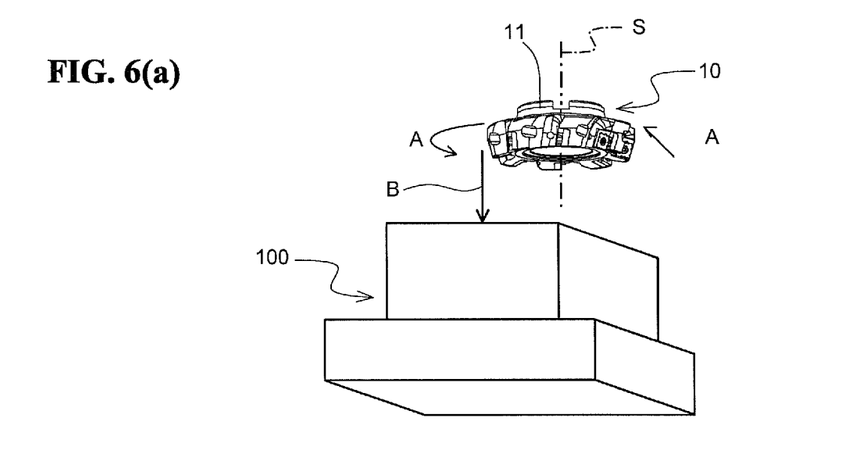
FIGS. 6(a) to (c) show process charts showing a cutting method for a workpiece in accordance with an embodiment of the present invention.
Figure 6B:
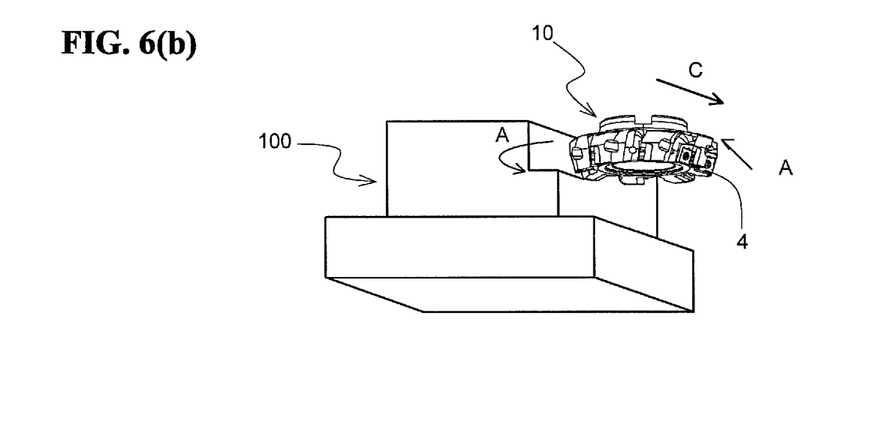
Figure 6C:
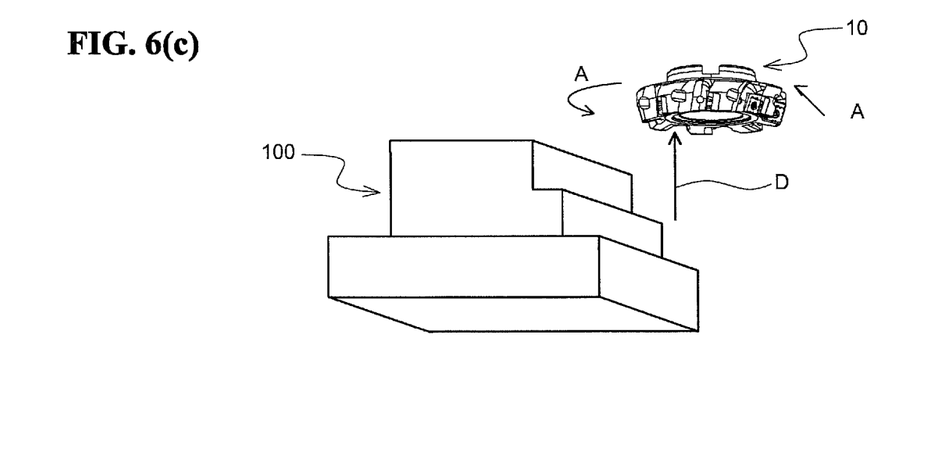

With reference to FIG. 6, a cutting method for workpiece in accordance with an embodiment of the present invention will be described using a case where the cutting tool 10 is used as an example. The cutting method for workpiece in accordance with this embodiment includes following steps (i) to (iii):

as shown in FIG. 6(*a*), the step of rotating the cutting tool 10 about the axis line S of the holder 11 in a direction of an arrow A and moving the cutting tool 10 in a direction of an arrow B so as to bring the cutting edges of the cutting tool 10 closer to a workpiece 100;

as shown in FIG. 6(*b*), the step of bringing the cutting edges 4 of the insert 1 into contact with a surface of the workpiece 100 and moving the cutting tool 10 in a direction of an arrow C to cut the surface of the workpiece 100; and as shown in FIG. 6(*c*), the step of moving the cutting tool 10 in a direction of an arrow D to separate the cutting tool 10 from the workpiece 100.

As described above, in this embodiment, since the steps (i) to (iii) are performed using the cutting tool 10 having the excellent chip discharging efficiency and long life, working efficiency and finished surface accuracy can be improved. That is, the chips generated by the divided cutting edges 41 can be prevented from being clogged between the workpiece 100 and the cutting edges 4, and defects of the cutting edges 4 and the grooves 5 can be suppressed. As a result, cutting with high working accuracy can be stably performed over a long time.

The cutting tool 10 only needs to be relatively closer to the workpiece 100, and for example, the workpiece 100 may be moved to be closer to the cutting tool 10. Similarly, in the step (iii), the workpiece 100 only needs to be relatively further from the cutting tool 10, and for example, the workpiece 100 may be moved to be further from the cutting tool 10. When cutting is continued, the step of bringing the cutting edge 4 of the insert 1 into contact with a different place of the workpiece 100 may be repeated while keeping the cutting tool 10 to be rotated. When a cutting edge 4 that is using is worn, the insert 1 may be rotated by 90 degrees relative to the center axis of the through hole 8 to use an unused cutting edge 4.

Although some embodiments of the present invention have been described above, as a matter of course, embodiments of the present invention are not limited to the above-mentioned embodiments and may be any embodiment as long as it does not deviate from the object of the invention. For example, although a plurality of grooves are formed in the above-mentioned embodiments, according to the present invention, at least one groove may be needed.

What is claimed is:

1. A cutting insert, comprising:
    a main body comprising
        an upper surface,
        a side surface,
        a groove that is formed on the side surface and extends to the upper surface at one end thereof, and
        a plurality of divided cutting edges that are located at an intersection line of the upper surface and the side surface and divided by the groove, wherein the upper surface comprises inclined parts located corresponding to the divided cutting edges, the inclined parts being in higher positions as being away from the intersection line, and a distance of lower ends of the inclined parts from the corresponding divided cutting edges increases toward centers of the corresponding divided cutting edges from ends of the corresponding divided cutting edges in a top plan view.

2. The cutting insert according to claim 1, wherein the inclined parts each comprise a concave surface that are in a higher position from a center to ends of the corresponding divided cutting edge, and extends in a direction perpendicular to the intersection line.

3. The cutting insert according to claim 2, wherein the inclined parts each further comprise a flat surface that has a substantially constant height from a center to ends of the corresponding divided cutting edge, the width of the flat surface increasing as being away from the intersection line.

4. The cutting insert according to claim 1, wherein the inclined parts each comprise
 a first inclined part, and
 a second inclined part that is located further from the lower end, is in a higher position and has a larger inclination angle, than the first inclined part, respectively.

5. The cutting insert according to claim 1, wherein the inclined parts each have concave shape in a sectional view perpendicular to the divided cutting edge.

6. The cutting insert according to claim 1, wherein the upper surface comprises
 the inclined parts, and
 a protruded part located between the inclined parts.

7. The cutting insert according to claim 1, wherein the protruded part is located corresponding to the groove.

8. A cutting tool, comprising:
 a holder; and
 a cutting insert attached to an outer part of the holder at a front end according to claim 1, wherein
 at least a part of the plurality of divided cutting edges protrudes outwards from the outer part of the holder at the front end.

9. The cutting tool according to claim 8 wherein the cutting insert attached to the holder, the plurality of divided cutting edges thereof having a positive axial rake angle.

10. A method of cutting a workpiece by use of the cutting tool according to claim 8, comprising:
 rotating the cutting tool;
 bringing at least a part of the plurality of divided cutting edges of the rotating cutting tool into contact with a surface of the workpiece; and
 separating the workpiece from the cutting tool.

* * * * *